UNITED STATES PATENT OFFICE.

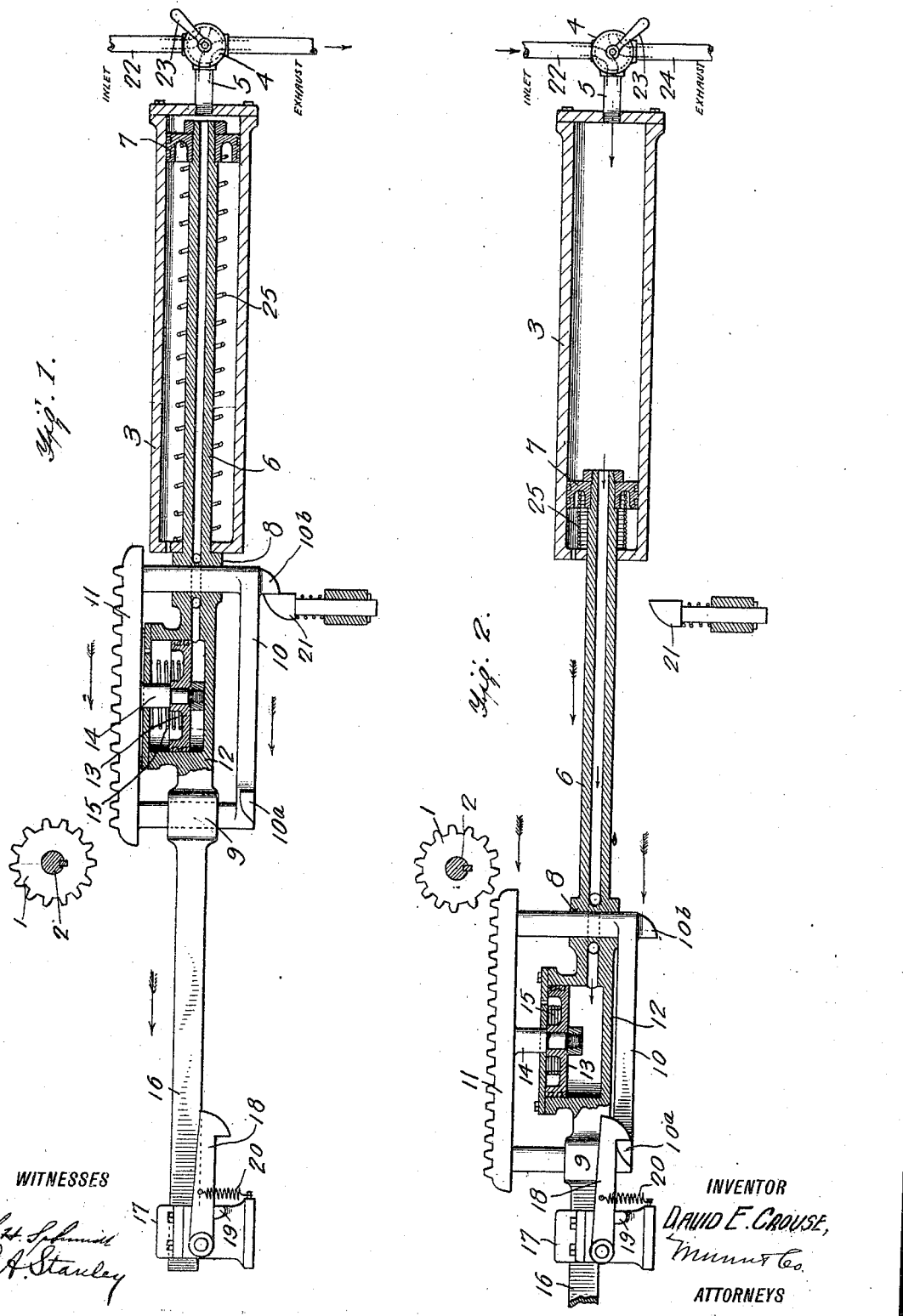

DAVID ELDRIDGE CROUSE, OF ANNAPOLIS, MARYLAND.

DEVICE FOR STARTING INTERNAL-COMBUSTION ENGINES.

1,036,972.

Specification of Letters Patent.

Patented Aug. 27, 1912.

Application filed October 20, 1911. Serial No. 655,664.

*To all whom it may concern:*

Be it known that I, DAVID E. CROUSE, a citizen of the United States, and a resident of Annapolis, in the county of Anne Arundel and State of Maryland, have invented an Improvement in Devices for Starting Internal-Combustion Engines, of which the following is a full, clear, and exact description.

My invention relates to improvements in devices for starting internal combustion engines and it consists in the combinations, constructions and arrangements herein described and claimed.

An object of my invention is to provide a device which will start an internal combustion engine through the medium of compressed air.

A further object of my invention is to provide a movable rack for engaging a pinion on the shaft of the engine, the movement of the rack into engagement with the pinion being accomplished by means of compressed air, and the return of the rack to its initial position being effected by means of a spring.

A further object of my invention is to provide means for moving the rack laterally out of engagement with the pinion on its return stroke.

Other objects and advantages will appear in the following specification, and the novel features of the invention will be particularly pointed out in the appended claims.

My invention is illustrated in the accompanying drawings forming part of this application, in which—

Figure 1 is a longitudinal section through the main parts of the device, the rack being shown in elevation; and Fig. 2 is a similar view showing the rack in its shifted position.

In carrying out my invention I provide a pinion 1 on the shaft 2. The cylinder 3 is connected at one end with a 3-way cock 4 by means of a pipe 5. The opposite end of the cylinder has an opening to receive the hollow rod 6. One end of this rod bears the piston 7. At 8 and 9 are integral enlargements of the rod which form guide members for the frame 10, of the rack 11.

A cylinder 12 communicates with the interior of the pipe 6 and is provided with a piston 13, whose piston rod 14 is secured to the rack as shown in the drawings. Between the piston rod and the end of the cylinder 12 is a spring 15 for normally holding the piston in its lower position.

The guide member 9 has an integral extension 16 which slides in a bearing 17. The latter is provided with a latch member 18 which is held normally against a stop 19 by means of a spring 20. The frame 10 is provided with a lug 10ª at one end designed to be engaged by the latch member 18 and has a similar lug or stop 10ᵇ which engages a spring-pressed stop 21.

From the foregoing description of the various parts of the device the operation thereof may be readily understood. The device is primarily designed to be used in starting automobiles from the seat. The 3-way cock is disposed in a position within easy reach of the operator and the inlet pipe 22 is designed to be connected with a source of compressed air (not shown).

Fig. 1 shows the normal position of the device. In starting the engine, the handle 23 is turned into the position shown in Fig. 2 and air is admitted behind the piston 7. The latter cannot move because of the engagement of the lug 10ᵇ with the stop 21. The air passes through the hollow rod 6 and into the interior of the cylinder 12, causing the piston 13 to rise and compress the spring 15. The rack 11 and frame 10 are therefore raised upwardly. When the lug 10ᵇ clears the stop member 21 the piston 7 is now free to move and in the forward movement the rack engages the gear 1 and turns it, thereby starting the engine. The rack passes on beyond the pinion and the lug 10ª catches underneath the latch member 18 thereby holding the rack.

After the engine is started, the 3-way cock is turned into the position shown in Fig. 1, thereby establishing communication between the pipe 5 and the exhaust pipe 24. The compressed air within the cylinder 3 now escapes through the exhaust pipe 24 and the spring 15 causes a downward movement of the piston 13 and of the rack 11 and its frame. When the lug 10ª clears the latch member 18 the spring 25 in the cylinder 3, which was compressed in the forward movement of the piston 7, now returns the piston to its original position, carrying the rack back to its original position, the lug 10ᵇ riding over the stop member 21 which springs in behind the lug, thereby leaving the apparatus in condition for again starting the engine.

I claim:—

1. In a device for starting internal combustion engines, a gear on the engine shaft, a rack normally out of alinement with said gear, a piston for moving said rack into alinement with said gear, a second piston for moving the rack into engagement with the gear, means for actuating both pistons, means for moving the rack again out of alinement with the gear, and means for returning the rack to its original position.

2. In a device for starting internal combustion engines, a gear on the engine shaft, a rack normally out of alinement with said gear, a piston for moving said rack into alinement with said gear, a second piston for moving the rack into engagement with the gear, means for actuating both of said pistons a spring for moving the rack again out of alinement with the gear, and a second spring for returning the rack to its original position.

3. In a device for starting internal combustion engines, a gear on the engine shaft, a rack normally out of alinement with said gear, said rack having a slidable frame, a cylinder, a piston within said cylinder, said piston being connected with the rack, a second cylinder, a piston within said second cylinder, a conduit connecting the interior of the two cylinders, a hollow piston rod for second piston, said piston rod serving as a guide member for the rack frame and establishing communication between the two cylinders, means for introducing compressed air into said second named cylinder, and means for preventing the movement of the piston in said second named cylinder until after the first named piston has been operated.

4. In a device for starting internal combustion engines, a gear on the engine shaft, a rack normally out of alinement with said gear, said rack having a slidable frame, a cylinder, a piston within said cylinder, said piston being connected with the rack for moving the latter, a second cylinder, a piston within said second cylinder, a hollow piston rod for said second piston, said piston rod serving as a guide member for the rack frame and for establishing communication between the two cylinders, a 3-way cock for introducing compressed air into said second named cylinder and for letting the air out of said second named cylinder, a lug carried by the rack frame, a spring stop member normally in the path of said lug, a second lug carried by said rack frame, and a latch member arranged to engage said second lug for holding the rack in its shifted position.

DAVID ELDRIDGE CROUSE.

Witnesses:
CHARLES E. PRINCE,
J. F. LAYNG.

Copies of this patent may be obtained for five cents each, by addressing the "Commissioner of Patents, Washington, D. C."